UNITED STATES PATENT OFFICE.

JAMES MacGREGOR, OF GLASGOW, SCOTLAND, ASSIGNOR TO HERBERT AUSTIN, OF FALL RIVER, MASSACHUSETTS.

PROCESS FOR EXTRACTING OLEAGINOUS SUBSTANCES FROM OLEAGINOUS-SUBSTANCE-CONTAINING MATERIALS.

1,351,483.        Specification of Letters Patent.    Patented Aug. 31, 1920.

No Drawing.    Application filed June 24, 1918. Serial No. 241,640.

*To all whom it may concern:*

Be it known that I, JAMES MACGREGOR, a subject of the King of Great Britain, residing at 19 Waterloo street, Glasgow, Scotland, have invented a new and useful Process for Extracting Oleaginous Substances from Oleaginous - Substance - Containing Materials; and I do hereby declare that the following is a full, clear, and exact description of the invention, which will enable others skilled in the art to which it appertains to make and use the same.

This invention relates to a process for the extraction of oil, wax, rosins and materials of a like nature from bone-charcoal, fullers' earth and other substances containing the same.

Certain substances, of which bone-charcoal and fullers' earth are good examples, are, when mixed with oil, so dense that it is not found practicable to extract the oil by the ordinary percolation system or by the application of solvent vapor. The extraction of the oil has been accomplished with a fair amount of success by mixing the solvents with the material and then allowing the mass to settle and decanting off the clear liquor, this operation being repeated until the oil is sufficiently exhausted. The solutions of solvent and oil thus obtained, however, only clear themselves of the solid material with the greatest difficulty, by settling or by filtering, when treated direct with the solution in the dry state.

According to my invention the oil-containing substances are mixed with water previous to extraction in order to form a paste or emulsion and this paste is then treated in a bath, or a succession of baths, of solvent which readily takes up the oil, while the settling out of the solids takes place with satisfactory rapidity. The solvents used, which are preferably lighter than water, are decanted from above the aqueous layer, the latter remaining for the succeeding baths or mixings until the oil is sufficiently exhausted. Any residual solvent remaining, either dissolved or mixed with the water or solids, is freed by the application of heat or by the injection of open steam and the vapors produced are condensed for recovery in the usual way.

The oil and solvent are separated by distillation in any of the usual appliances for such a purpose.

Claims.

1. A process for the extraction of oil, wax, rosins and the like from bone-charcoal, fullers' earth and like substances containing the same, consisting in mixing the said material with water to form a paste or emulsion and subsequently treating the said paste or emulsion with a solvent which separates the oil from the water and material.

2. A process for the extraction of oil, wax, rosins and the like from bone-charcoal, fullers' earth and like substances containing the same, consisting in mixing the said material with water to form a paste or emulsion, treating the said paste or emulsion in successive baths of a solvent which is lighter than water, allowing the solid particles to settle and then decanting off the resulting supernatant layer of solvent with dissolved oil or the like, substantially as hereinbefore described.

3. In a process as defined in claim 2, the recovery of the solvent from the oil by the application of heat to said solvent and oil.

JAMES MacGREGOR.

Witnesses:
  MARGARET D. GRAHAM,
  JOHN MITCHELL.